April 5, 1927.  E. R. BURTNETT  1,623,384
INTERNAL COMBUSTION ENGINE
Filed May 31, 1923
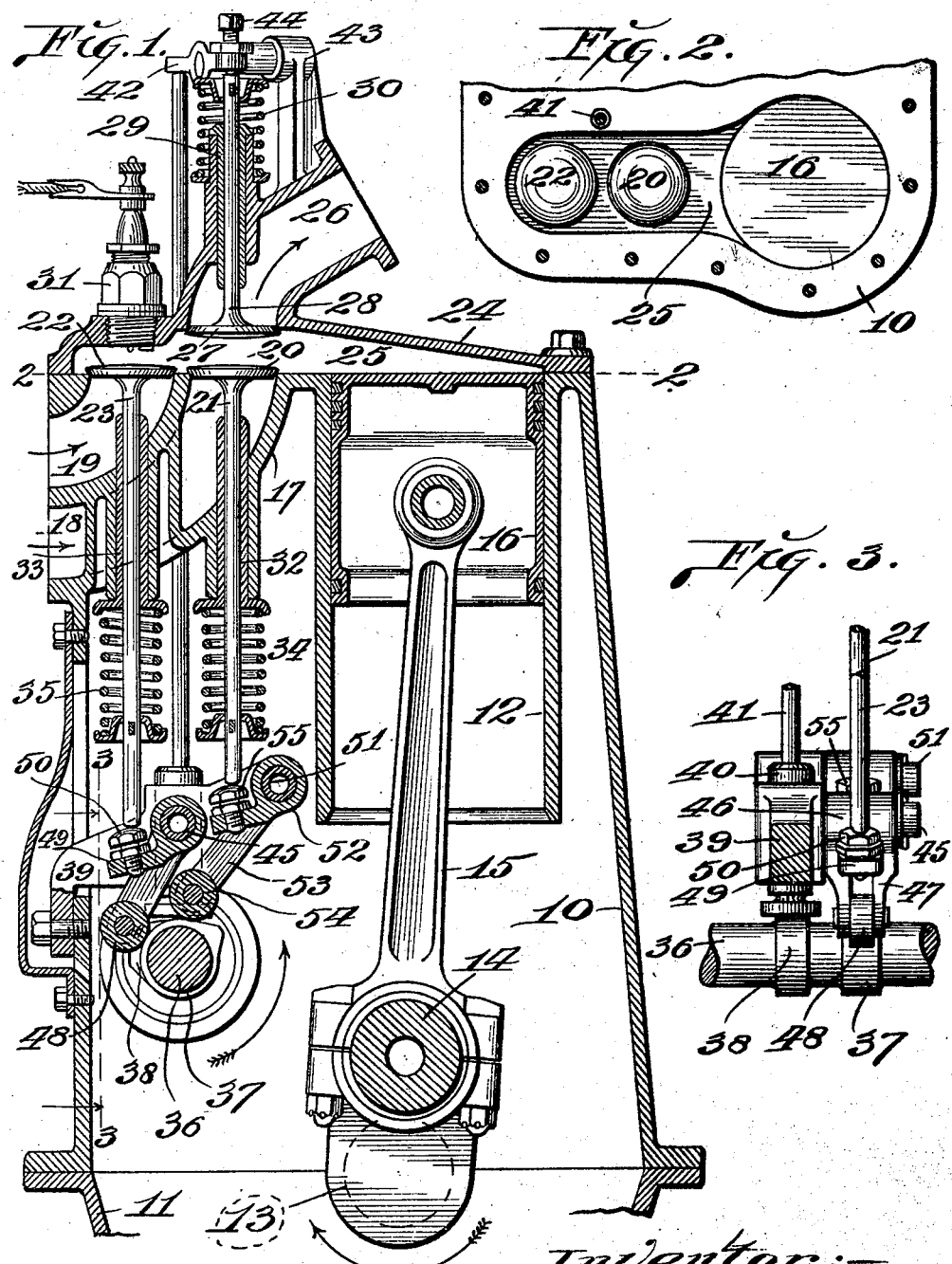

Patented Apr. 5, 1927.

1,623,384

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed May 31, 1923. Serial No. 642,503.

My invention relates generally to internal combustion engines, and more particularly to an engine of the four stroke cycle type, the principal object being to generally improve upon and simplify the construction of the existing forms of four stroke cycle internal combustion engines and to provide a relatively simple structure that may be easily and cheaply produced and which may be operated economically and effectively in the development of rotary motion and power.

Further objects of my invention are to provide a four stroke cycle internal combustion engine with timed valvular means for mechanically inducting into the combustion chamber, a two part charge, one part being an inert volume non-throttled and constant in volume during the period of the first part of the piston induction stroke and the second part being a volume of gaseous fuel mixture that is throttled and variable in volume during the last part of the period of the piston's induction stroke, and during which induction of the gaseous mixture, the inert volume supply has been cut off.

A further object of my invention is to provide a four-stroke cycle internal combustion engine structure and method of operation wherein a relatively high degree of compression can be used without detonation and in which engine long periods of full load operation will not cause distortion of the engine parts as a result of excessive heat and in which engine the ratio of gaseous expansion is materially increased with respect to a given quantity of fuel.

A further object of the invention is to provide a four-stroke cycle internal combustion engine in which a two part charge is inducted mechanically and successively, said engine having a combustion chamber of the least possible wall area compatible with the design most practical for silent and continued operation and with minimum cost of manufacture.

Further objects of my invention are to provide in an engine of the character referred to a valve arrangement that may be easily and cheaply produced, and which will permit ready assembly and adjustment; to provide for a constant inert volume supply to the combustion chamber within the cylinder, and the stratification of the inert charge in a volume directly over the piston during the maximum compression period and while the two part charge is compressed into the compression clearance proper, for combustion; to provide for a throttle control for the variation of the gaseous mixture volume which is additional to a constant volume of inert first part charge; and, further, to provide for the stratification and confinement of the gaseous mixture within the valve pocket where it may be instantly ignited and complete combustion effected.

Further objects of my invention are to provide an internal combustion engine in which instant or auto-ignition from charge temperatures, or from compressions pressures, will not cause detonation, such result being attained by reason of the presence of a constant, stratifying, inert volume that holds in check the pressure rise from the initial stage of combustion and absorbs heat as an inert volume from the gaseous volume, the combustion of which generates heat; to provide in an internal combustion engine for the absorption of the shock resulting from the instantaneous combustion of the gaseous fuel charge; and to provide for the absorption of pressure variations; to provide for the centering of the fluctuations and producing uniform expansion, and which actions may be compared to a flywheel which in its duty absorbs the sharp impulses of power and gives back smooth twisting effort.

A still further object of my invention is to provide an internal combustion engine in which a constant inert volume of free cool air, or cooled products of combustion, is inducted into the cylinder first and for the period during the piston movement through the first half of the stroke, thereby providing an atmospheric pressure condition within the cylinder at the time of the cutting off of the inert volume supply and the beginning of the induction of the throttle controlled volume of gaseous fuel mixture, and which action produces within the cylinder at the time of the admission of the gaseous fuel mixture a non-rarefication condition of the inert volume, and consequently effecting stratification of the two part inducted charge.

A still further object of the invention is to provide in an engine of the character described a special form of combustion chamber with particularly arranged valve means and a novel cam and valve actuating mechanism whereby a successful two part charge induction and charge stratification is accomplished.

With the foregoing and other objects in view, my invention consists in certain novel features of construction and arrangements of parts, that will be more fully hereinafter described, and illustrated in the accompanying drawings, in which,—

Fig. 1 is a vertical section taken lengthwise through the center of an internal combustion engine of my improved construction.

Fig. 2 is a horizontal section on a reduced scale, and taken approximately on the line 2—2 of Fig. 1.

Fig. 3 is a vertical section taken on line 3—3 of Fig. 1.

Referring by numerals to the accompanying drawings, 10 designates a shell or housing that serves as the upper part of the crank case of the engine inasmuch as it is positioned on top of the lower part 11 of the crank case, and formed integral with the upper portion of said shell or housing is a cylinder 12, or a series of cylinders, where the engine is a multi-cylinder type.

Formed in the end walls of parts 10 and 11 are bearings for a crank shaft 13 having a crank 14 on which is journaled the lower end of a connecting rod 15, and the upper end of the latter being connected to the wristpin of a piston 16 that is arranged for reciprocatory movement in cylinder 12.

Formed integral with the upper portion of the shell or casing 10 and to the side of the cylinder 12 is a block 17, through which is formed an inert volume duct or passageway 18 and a gaseous fuel inlet duct 19. The inner end of duct 18 terminates adjacent to the clearance or chamber within cylinder 12, and formed at the inner end of said duct is a seat for an ordinary poppet valve 20 having a depending stem 21.

The inner end of the fuel inlet duct 19 terminates adjacent to and outside of one end of duct 18, and formed at the inner end of said duct 19 is a seat for an ordinary poppet valve 22 having a depending stem 23. Thus, the air and gas inlet valves 20 and 22 are directly in line with each other and with the axis of cylinder 12 and with the air inlet valve 20 disposed between gas inlet valve 22 and the piston clearance chamber within cylinder 12.

Secured on top of the housing 10 is a head plate or block 24 in the underside of which is formed a shallow recess 25 that communicates directly with the inner ends of the ducts 18 and 19 and with the piston clearance chamber in cylinder 12. Thus, the recess 25 provides a duct which permits the inert volume and the gaseous fuel volume to enter the piston clearance chamber, and said recess also performs the functions of a charge compression, combustion and expansion chamber.

Leading from a point in chamber 25, preferably directly above the inner end of duct 18 is an exhaust duct or passageway 26, the inner end thereof being provided with a seat for an ordinary poppet valve 27 having an upwardly projecting stem 28, said stem operating through a suitable bearing 29 and having associated with it a spring 30 which acts to normally retain the valve 27 upon its seat.

Seated in the head 24 preferably at a point above the inner end of gaseous fuel duct 19 is an ignition device, preferably, a spark plug 31 and the terminals of the electrodes thereof project into the chamber 25 directly above the gaseous fuel inlet 22.

The valve stems 21 and 23 are arranged for sliding movement through suitable bearings 32 and 33, respectively, and associated with the lower portions of said stems are respectively springs 34 and 35 that act to normally hold the valves 20 and 22 upon their seats.

Arranged for rotation in suitable bearings above and to one side of the crank shaft 13 is a cam shaft 36 having a cam 37 that is adapted to actuate suitable mechanism to unseat the valves 20 and 22, and formed on said cam shaft adjacent to the cam 37 is a second cam 38 that is adapted to actuate certain mechanism to unseat the exhaust valve 27.

The cam shaft 36 is arranged to rotate at half speed on the crank shaft 13, preferably by means of suitable gearing between said shafts.

Fixed to the wall of the housing 10 is a bracket 39 that projects inwardly over the cam shaft 36, and arranged for sliding movement in a portion of said bracket is a plunger 40, the lower end of which bears directly on the periphery of cam 38. The lower end of a push rod 41 is connected to plunger 40, said push rod passing through a bearing in the head 24, and its upper end bearing against the underside of one end of a rocker arm 42 that is journaled on a suitably located bracket 43. The opposite end of this rocker arm 42 carries an adjustable member 44 that bears on the upper end of the exhaust valve stem 28.

Journalled on a pin 45 that projects laterally from bracket 39 is a rocker arm 46 that is shaped substantially like a bellcrank, and its depending longer arm 47 is bifurcated to receive a journalled roller 48 that rides on the periphery of cam 37. The short arm 49 of this rocker arm is provided with an adjustable member 50 upon which bears the lower end of valve stem 23. A second pin 51 projects laterally from bracket 39, and journalled thereon is a bellcrank shaped rocker arm 52 that is practically a duplicate of rocker arm 45, and journalled in the bifurcated longer arm 53 of said rocker arm 52 is a roller 54 that rides on the periphery of cam 37.

The short arm of the rocker 52 carries an adjustable member 53 upon which bears the lower end of valve stem 21.

With the parts of my engine positioned as illustrated in Fig. 1, piston 16 is at the upper end of its travel following its exhaust or scavenging stroke. As piston 16 starts downward on the charge induction stroke, the lobe of cam 37 bears against roller 54, thereby rocking member 52 so as to lift valve stem 21 and unseat the inert volume inlet valve 20, and, due to the length of the lobe of the cam 37, said valve 20 is maintained open for approximately half the downward stroke of said piston 16. Thus, during the first portion of the induction stroke of the piston, an inert volume of cool air, or cooled products of combustion, will be drawn through duct 18 and chamber 25 to fill the piston clearance space directly above the head of the downwardly moving piston.

As the lobe of cam 37 passes roller 54, spring 34 will act to close valve 20, and immediately thereafter the lobe of cam 37 engages roller 48 to rock member 46, thereby moving stem 23 upward and lifting the gaseous fuel inlet valve 22 from its seat. This action takes place, and the valve 22 is held open during the latter half of the downward travel of piston 16 on the induction stroke, and while said valve 22 is held open a charge of gaseous fuel in inducted into the upper portion of the clearance chamber within cylinder 12, and which gaseous fuel charge overlies the preceding inert volume that was drawn into the cylinder.

As the lobe of cam 37 passes roller 48, spring 35 returns valve 22 to its seat, and upon the succeeding upward or compression stroke, the piston 16, the inert volume and the charge of gaseous fuel will be compressed in stratified relation within chamber 25 with the compressed gaseous fuel occupying that end of the chamber that is occupied by valve 22 and the inner end of the spark plug 31, and with the compressed inert volume occupying that portion of the chamber that is practically above piston 16.

It will be understood that the compression stroke of the piston 16 will produce a certain amount of turbulence in chamber 25, but the greatest degree of such turbulence takes place in the intermediate portion of said chamber or in the space between valves 20 and 27.

Owing to the narrowness of that portion of chamber 25 between valve 22 and spark plug 31, the turbulent action occurring in the intermediate portion of said chamber 25 gradually decreases toward the narrow portion of said chamber between valve 22 and spark plug 31, so that, at the point of highest compression there is a small volume of practically undiluted gaseous fuel in the chamber into which the spark plug projects.

Further, the degree of turbulence produced within chamber 25 is not sufficient to entirely sweep away the stratum of inert volume that lies directly against the head of piston 16, during its compression stroke. In this connection, it has been demonstrated in repeated tests and experiments that in the turbulence chambers of internal combustion engines there is always a thin stratum or "skin" of gas or air that lies against the surfaces of the walls of said chamber and which stratum is practically undisturbed during turbulence of the gaseous fuel charge that is under compression.

At the point of highest compression, or when piston 16 passes high center, or immediately thereafter, the compressed gaseous fuel charge is ignited by a spark produced between the terminals of the electrodes of plug 31, and the resulting explosion acting through the highly compressed stratum of inert volume forces the piston 16 downward on its power stroke. Owing to the presence of the inert volume between the head of the piston and the compressed charge of gaseous fuel, the relatively high temperatures resulting from combustion of the fuel will not be transmitted to the piston, and the wall of the cylinder 12, and as the spark that ignites the compressed fuel charge is produced practically in the center of the compressed charge, there will be no detonation such as would ordinarily result where the spark is produced at one end or side of the compressed fuel charge.

As the piston reaches the lower end of its power stroke the lobe of cam 38 bears against the lower end of plunger 40, thereby lifting the same and its associated push rod 41, and as a result, rocker 42 is swung upon its axis to move valve stem 28 downward, thereby unseating exhaust valve 27, and as the latter is maintained in open or unseated position during the succeeding upward stroke of piston 16, the products of combustion and burnt gases will be forced from chamber 25 past the open exhaust valve 27 and out through duct 26.

An internal combustion engine of my improved construction is comparatively simple, may be easily and cheaply produced, utilizes a charge consisting of an inert volume and a variable volume of gaseous fuel, said parts being compressed in stratified relation and disposed so as to eliminate detonation when the compressed fuel charge is ignited, and likewise disposed so as to prevent the transmission of high temperatures from the ignited charge to the piston and the surrounding cylinder wall.

It will be understood that minor changes in the construction, form or size of the various parts of my internal combustion engine may be made and substituted for those herein shown and described without departing from the spirit of the invention, the scope of which is set forth in the appended claims.

I claim as my invention:

1. In a four stroke cycle internal combustion engine, a block provided with a combustion chamber and a pair of inlet ducts, the inner ends of which ducts terminate at the top surface of said block, one behind the other and both in line with the axis of the combustion chamber, a head for said block, which head is provided in its under side with a shallow recess that provides a clearance chamber for the combustion chamber, said recess having an extension that overlies the inner ends of the inlet ducts, an exhaust duct leading upwardly from the central portion of said clearance chamber, a downwardly opening valve normally closing the inner end of said exhaust duct, downwardly seating valves normally closing the inner ends of the inlet ducts, a piston arranged for operation within the combustion chamber, means for positively unseating, in sequence, during the suction stroke of the piston, the inlet duct controlling valves and means for positively unseating the exhaust duct control valve during the exhaust stroke of said piston.

2. In a four stroke cycle internal combustion engine, a block provided with a common combustion chamber and a pair of inlet ducts, the ends of which ducts terminate at the top surface of said block, one behind the other and both in line with the axis of the combustion chamber, a head for said block, which head is provided in its under side with a shallow recess that provides a clearance chamber for the combustion chamber, said recess having an extension that overlies the inner ends of the inlet ducts, an exhaust duct leading upwardly from the central portion of said clearance chamber, a downwardly opening valve normally closing the inner end of said exhaust duct, downwardly seating valves normally closing the combustion chamber, means for positively unseating, in sequence, during the suction stroke of the piston, the inlet duct controlling valves, means for positively unseating the exhaust duct control valve during the exhaust stroke of said piston and ignition means seated in said head and projecting into the extension of the clearance chamber at a point above the outer one of the downwardly seating valves.

3. In a four stroke cycle internal combustion engine, a combustion cylinder, a crank shaft, a common compression and combustion clearance chamber extending laterally from the head end of the combustion chamber, three valves seated in the wall of said common clearance chamber, each of said three valves controlling a separate duct that communicates with said common clearance chamber, the axis of said three valves being arranged in direct alignment with each other and with the axis of the combustion cylinder and disposed at right angles to the crank shaft of the engine and rocker arms arranged in tandem and at right angles to the axis of the crank shaft for actuating two of said valves.

4. In a four stroke cycle internal combustion engine, a combustion cylinder, a piston arranged for operation therein, a crank shaft to which said piston is connected, a common compression and combustion clearance chamber extending laterally from the head end of the combustion chamber, a pair of separate charge volume inlet ducts leading to the lower portion of said common clearance chamber, the inner ends of said ducts being disposed one behind the other and in a plane at right angles to the axis of the crank shaft, valves normally closing the inner ends of said ducts, a duct leading from the upper portion of the common clearance chamber, a valve closing said last-mentioned duct, an ignition device seated in the wall of the common clearance chamber and disposed above the inner end of the outer one of the two ducts that enter the lower portion of the common clearance chamber, a cam shaft arranged to operate at half the speed of the crank shaft, means actuated by said cam shaft for successively opening the two valves that control the ducts communicating with the lower portion of the common clearance chamber and means operated from said cam shaft for unseating the valve that controls the duct leading from the upper portion of said common clearance chamber.

5. In a four stroke cycle internal combustion engine, a combustion cylinder, a piston arranged for operation therein, a crank shaft to which said piston is connected, a common compression and combustion clearance chamber extending laterally from the head end of the chamber in the combustion cylinder, a pair of charge volume inlet ducts leading to the lower portion of said common clearance chamber, said ducts being disposed one behind the other and in alignment with the axis of the combustion cylinder, valves normally closing the inner ends of said inlet ducts, a cam shaft lying parallel with the crank shaft and arranged to operate at half the speed thereof and a pair of valve-actuating rocker arms arranged in tandem in a plane at right angles to the plane occupied by the axis of the crank shaft and which rocker arms are actuated by a cam on said cam shaft.

In testimony whereof I have signed my name to this specification.

EVERETT R. BURTNETT.